United States Patent
Kotoku (10) Patent No.: US 10,183,531 B2
(45) Date of Patent: Jan. 22, 2019

(54) PNEUMATIC TIRE

(71) Applicant: The Yokohama Rubber Co., LTD., Minato-ku, Tokyo (JP)

(72) Inventor: Koichi Kotoku, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 404 days.

(21) Appl. No.: 14/434,473

(22) PCT Filed: Oct. 10, 2012

(86) PCT No.: PCT/JP2012/076250
§ 371 (c)(1),
(2) Date: Apr. 9, 2015

(87) PCT Pub. No.: WO2014/057552
PCT Pub. Date: Apr. 17, 2014

(65) Prior Publication Data
US 2015/0273943 A1 Oct. 1, 2015

(51) Int. Cl.
*B60C 3/04* (2006.01)
*B60C 9/18* (2006.01)
(Continued)

(52) U.S. Cl.
CPC .............. *B60C 3/04* (2013.01); *B60C 7/00* (2013.01); *B60C 9/185* (2013.01); *B60C 9/20* (2013.01); *B60C 9/2006* (2013.01); *B60C 9/28* (2013.01); *B60C 11/0083* (2013.01); *B60C 11/01* (2013.01); *B60C 11/04* (2013.01); *B60C 2009/208* (2013.01); *B60C 2009/2064* (2013.01); *B60C 2009/2083* (2013.01);
(Continued)

(58) Field of Classification Search
CPC .................................... B60C 11/110083
USPC ............................... 152/454, 209.4
See application file for complete search history.

(56) References Cited

U.S. PATENT DOCUMENTS 4,214,618 A * 7/1980 Takigawa ............... B60C 11/01
152/209.16
4,442,879 A * 4/1984 Uemura ................. B29D 30/00
152/209.14
(Continued)

FOREIGN PATENT DOCUMENTS

| JP | H04-066304 | 3/1992 |
| JP | 2001-522748 | 11/2001 |

(Continued)

OTHER PUBLICATIONS

International Search Report for International Application No. PCT/JP2012/076250 dated Jan. 15, 2013, 4 pages, Japan.

*Primary Examiner* — Jodi C Franklin
(74) *Attorney, Agent, or Firm* — Thorpe North & Western (57) ABSTRACT

In a pneumatic tire, a belt layer is formed by laminating a pair of cross belts having a belt angle, as an absolute value, of not less than 10° and not greater than 45° and having belt angles of mutually opposite signs, and a circumferential reinforcing layer having a belt angle within a range of ±5° with respect to the tire circumferential direction. Moreover, the distance (Gcc) from the tread profile to the tire inner circumferential surface along the tire equatorial plane and the distance (Gsh) from the tread edge to the tire inner circumferential surface have a relationship satisfying 1.10≤Gsh/Gcc.

25 Claims, 7 Drawing Sheets (51) Int. Cl.
*B60C 11/01* (2006.01)
*B60C 11/00* (2006.01)
*B60C 9/20* (2006.01)
*B60C 9/28* (2006.01)
*B60C 7/00* (2006.01)
*B60C 11/04* (2006.01)
*B60C 9/22* (2006.01)

(52) U.S. Cl.
CPC .............. *B60C 2009/2242* (2013.01); *B60C 2009/2261* (2013.01); *B60C 2009/2266* (2013.01); *B60C 2011/0033* (2013.01)

(56) References Cited

U.S. PATENT DOCUMENTS

| | | | | |
|---|---|---|---|---|
| 4,498,514 | A * | 2/1985 | Maathuis | B60C 9/009 152/527 |
| 5,131,446 | A * | 7/1992 | Fukumoto | B60C 9/006 152/454 |
| 5,616,195 | A * | 4/1997 | Marquet | B60C 9/009 152/209.14 |
| 5,660,652 | A * | 8/1997 | Young | B60C 11/00 152/209.14 |
| 5,735,979 | A * | 4/1998 | Secondari | B60C 3/06 152/209.5 |
| 6,116,309 | A * | 9/2000 | Gillard | B60C 11/0083 152/209.14 |
| 6,213,181 | B1 * | 4/2001 | Janajreh | B60C 11/00 152/209.16 |
| 6,401,778 | B1 | 6/2002 | Cluzel | |
| 6,722,408 | B2 * | 4/2004 | Naito | B60C 11/00 152/209.14 |
| 8,225,835 | B2 * | 7/2012 | Harikae | B60C 9/006 152/527 |
| 8,272,414 | B2 * | 9/2012 | Matsunaga | B60C 9/009 152/209.14 |
| 8,528,613 | B2 * | 9/2013 | Isobe | B60C 9/006 152/454 |
| 9,038,682 | B2 * | 5/2015 | Wang | B60C 9/006 152/209.18 |
| 9,272,578 | B2 * | 3/2016 | Iga | B60C 11/0083 |
| 9,381,774 | B2 * | 7/2016 | Becker | B60C 9/006 |
| 9,623,705 | B2 * | 4/2017 | Tanaka | B60C 1/00 |
| 2004/0069392 | A1 * | 4/2004 | Maruoka | B60C 3/04 152/454 |
| 2004/0079460 | A1 * | 4/2004 | Maruoka | B60C 9/18 152/209.14 |
| 2005/0000613 | A1 * | 1/2005 | Maruoka | B60C 11/00 152/209.1 |
| 2005/0016656 | A1 * | 1/2005 | Kuroki | B60C 11/00 152/548 |
| 2006/0169380 | A1 | 8/2006 | Radulescu et al. | |
| 2006/0169381 | A1 * | 8/2006 | Radulescu | B60C 9/2006 152/531 |
| 2006/0169383 | A1 | 8/2006 | Radulescu et al. | |
| 2007/0151646 | A1 * | 7/2007 | Ito | B60C 11/0306 152/209.25 |
| 2007/0169870 | A1 * | 7/2007 | Manno | B60C 9/2006 152/531 |
| 2008/0105347 | A1 * | 5/2008 | Matsunaga | B60C 3/04 152/209.14 |
| 2009/0277557 | A1 * | 11/2009 | Suzuki | B60C 9/2006 152/532 |
| 2011/0041972 | A1 * | 2/2011 | Kageyama | B60C 11/0306 152/209.15 |
| 2011/0192513 | A1 * | 8/2011 | Hamada | B60C 3/04 152/209.18 |
| 2011/0220259 | A1 * | 9/2011 | Suzuki | B60C 11/00 152/209.18 |
| 2011/0315288 | A1 * | 12/2011 | Yamahira | B60C 11/0083 152/209.14 |
| 2013/0024010 | A1 * | 1/2013 | Dill | G05B 11/01 700/11 |
| 2014/0305566 | A1 * | 10/2014 | Mashiyama | B60C 9/18 152/454 |
| 2014/0326380 | A1 * | 11/2014 | Kotoku | B60C 9/0007 152/209.18 |

FOREIGN PATENT DOCUMENTS

| | | |
|---|---|---|
| JP | 2006-528103 | 12/2006 |
| JP | 2007-131217 | 5/2007 |
| JP | 2008-001264 | 1/2008 |
| JP | 2010-023742 | 2/2010 |
| JP | 4642760 | 3/2011 |
| JP | 4663638 | 4/2011 |
| JP | 4663639 | 4/2011 |
| JP | 4918948 | 4/2012 |
| JP | 4984013 | 7/2012 |
| WO | WO 99-024269 | 5/1999 |
| WO | WO 2005/016666 | 2/2005 |
| WO | WO 2005/016667 | 2/2005 |
| WO | WO 2005/016668 | 2/2005 |
| WO | WO 2007/148447 | 12/2007 |
| WO | WO 2013/042255 | 3/2013 |
| WO | WO 2013/042256 | 3/2013 |

* cited by examiner

COMPARATIVE EXAMPLE
(Gsh/Gcc=1.06)

FIG. 4B

WORKING EXAMPLES
(Gsh/Gcc=1.20)

|  | Conventional Example | Comparative Example | Working Example 1 | Working Example 2 | Working Example 3 | Working Example 4 | Working Example 5 | Working Example 6 | Working Example 7 | Working Example 8 | Working Example 9 |
|---|---|---|---|---|---|---|---|---|---|---|---|
| Circumferential reinforcing layer | None | Yes | Yes | Yes | Yes | Yes | Yes | Yes | Yes | Yes | Yes |
| Gsh/Gcc | 1.06 | 1.06 | 1.10 | 1.20 | 1.25 | 1.25 | 1.25 | 1.25 | 1.25 | 1.25 | 1.25 |
| (D2 - D3)/(D1 - D3) | 0.90 | 0.90 | 0.85 | 0.80 | 0.80 | 0.80 | 0.80 | 0.80 | 0.65 | 0.50 | -0.65 |
| Ws/TW | - | 0.65 | 0.65 | 0.65 | 0.65 | 0.70 | 0.80 | 0.90 | 0.80 | 0.80 | 0.80 |
| Wsh/GD | 1.0 | 1.0 | 1.0 | 1.0 | 1.0 | 1.0 | 1.0 | 1.0 | 1.0 | 1.0 | 1.0 |
| Wsh/TW | 0.25 | 0.25 | 0.25 | 0.25 | 0.25 | 0.25 | 0.25 | 0.25 | 0.25 | 0.25 | 0.25 |
| θ (°) | 0 | 0 | 0 | 0 | 0 | 0 | 0 | 0 | 0 | 0 | 0 |
| Groove bottom shape of outermost circumferential main grooves | Straight | Straight | Straight | Straight | Straight | Straight | Straight | Straight | Straight | Straight | Straight |
| Breaking elongation of tread rubber (%) | 300 | 300 | 300 | 300 | 300 | 300 | 300 | 300 | 300 | 300 | 300 |
| Tear resistance performance | 100 | 95 | 101 | 103 | 105 | 107 | 109 | 108 | 111 | 113 | 112 |

FIG. 9

| | Working Example 10 | Working Example 11 | Working Example 12 | Working Example 13 | Working Example 14 | Working Example 15 | Working Example 16 | Working Example 17 | Working Example 18 | Working Example 19 | Working Example 20 | Working Example 21 | Working Example 22 | Working Example 23 | Working Example 24 | Working Example 25 | Working Example 26 |
|---|---|---|---|---|---|---|---|---|---|---|---|---|---|---|---|---|---|
| Circumferential reinforcing layer | Yes | Yes | Yes | Yes | Yes | Yes | Yes | Yes | Yes | Yes | Yes | Yes | Yes | Yes | Yes | Yes | Yes |
| Gsh/Gcc | 1.10 | 1.20 | 1.25 | 1.25 | 1.25 | 1.20 | 1.10 | 1.25 | 1.25 | 1.25 | 1.25 | 1.25 | 1.25 | 1.25 | 1.25 | 1.25 | 1.25 |
| (D2 − D3)/(D1 − D3) | 0.85 | 0.85 | 0.50 | 0.50 | 0.50 | 0.85 | 0.85 | 0.50 | 0.50 | 0.50 | 0.50 | 0.50 | 0.50 | 0.50 | 0.50 | 0.50 | 0.50 |
| Ws/TW | 0.70 | 0.70 | 0.80 | 0.80 | 0.80 | 0.70 | 0.70 | 0.80 | 0.80 | 0.80 | 0.80 | 0.80 | 0.80 | 0.80 | 0.80 | 0.80 | 0.80 |
| Wsh/GD | 1.5 | 1.5 | 1.5 | 3.0 | 4.0 | 4.0 | 4.0 | 3.0 | 3.0 | 3.0 | 3.0 | 3.0 | 3.0 | 3.0 | 3.0 | 3.0 | 3.0 |
| Wsh/TW | 0.25 | 0.25 | 0.25 | 0.25 | 0.25 | 0.25 | 0.25 | 0.10 | 0.15 | 0.20 | 0.15 | 0.15 | 0.15 | 0.15 | 0.15 | 0.15 | 0.15 |
| θ (°) | 0 | 0 | 0 | 0 | 0 | 0 | 0 | 0 | 0 | 0 | 4 | 7 | 10 | 10 | 10 | 10 | 10 |
| Groove bottom shape of outermost circumferential main grooves | Straight | Straight | Straight | Straight | Straight | Straight | Straight | Straight | Straight | Straight | Straight | Straight | Straight | Zigzag | Zigzag | Zigzag | Zigzag |
| Breaking elongation of tread rubber (%) | 300 | 300 | 300 | 300 | 300 | 300 | 300 | 300 | 300 | 300 | 300 | 300 | 300 | 300 | 350 | 400 | 450 |
| Tear resistance performance | 111 | 113 | 114 | 117 | 118 | 116 | 115 | 119 | 120 | 122 | 124 | 125 | 126 | 127 | 128 | 129 | 130 |

FIG. 10

PNEUMATIC TIRE

TECHNICAL FIELD

The present technology relates to a pneumatic tire, and more particularly relates to a pneumatic tire with improved tear resistance.

BACKGROUND

Recent heavy duty tires mounted on trucks, buses, and the like maintain the shape of the tread portion due to the tires having a low aspect ratio and having a circumferential reinforcing layer disposed in the belt layer. The circumferential reinforcing layer is a belt ply having a belt angle that is substantially 0° with respect to the tire circumferential direction, and is disposed laminated on a pair of cross belts. The technology disclosed in Japanese Patent Nos. 4642760, 4663638 and 4663639 relates to conventional pneumatic tires that are configured in this manner. Suppressing tears in a shoulder land portion is a problem with pneumatic tires.

SUMMARY

The present technology provides a pneumatic tire with improved tear resistance performance.

A pneumatic tire according to the present technology includes: a carcass layer; a belt layer disposed on an outer side of the carcass layer in a tire radial direction; a tread rubber disposed on an outer side of the belt layer in the tire radial direction; at least three circumferential main grooves extending in a tire circumferential direction; and a plurality of land portions defined by the circumferential main grooves, wherein, upon the left and right circumferential main grooves on an outermost side in a tire width direction being referred to as outermost circumferential main grooves, as well as upon the left and right land portions on an outer side in the tire width direction defined by the outermost circumferential main grooves being referred to as shoulder land portions, the belt layer is formed by laminating a pair of cross belts having a belt angle, as an absolute value, of not less than 10° and not greater than 45° and having belt angles of mutually opposite signs, and a circumferential reinforcing layer having a belt angle within a range of ±5° with respect to the tire circumferential direction, a distance Gcc from a tread profile to a tire inner circumferential surface along a tire equatorial plane and a distance Gsh from a tread edge to the tire inner circumferential surface have a relationship satisfying 1.10≤Gsh/Gcc, and an outside diameter D1 of the tread profile along the tire equatorial plane, an outside diameter D2 of the tread profile at an edge portion on an inner side of the shoulder land portion in the tire width direction, and an outside diameter D3 of the tread profile at a tread edge have a relationship satisfying D1>D2, D1>D3, and −0.65≤(D2−D3)/(D1−D3)≤0.85.

In the pneumatic tire according to the present technology, (1) because the ratio Gsh/Gcc is set to a high value, the tread face as a whole has a flat (substantially parallel to the tire rotational axis) shape, and further, the volume of tread rubber (distance Gsh) in the shoulder portion is assured. As a result, the amount of deformation of the shoulder portion when the tire contacts the ground is reduced, and rigidity of the shoulder land portion is properly assured. Furthermore, (2) because the relationships among the outside diameters D1 to D3 at each location of the tread profile are made appropriate, the amount of deformation of the shoulder portion when the tire contacts the ground is further reduced. As a result, there is an advantage that the occurrence of tears in the shoulder land portion is effectively suppressed.

DETAILED DESCRIPTION

The present technology is described below in detail with reference to the accompanying drawings. However, the present technology is not limited to these embodiments. Moreover, constituents which can possibly or obviously be substituted while maintaining consistency with the present technology are included as constituents of the embodiments. Furthermore, a plurality of modified examples that are described in the embodiments can be freely combined within a scope of obviousness for a person skilled in the art.

Pneumatic Tire

Figure 1:
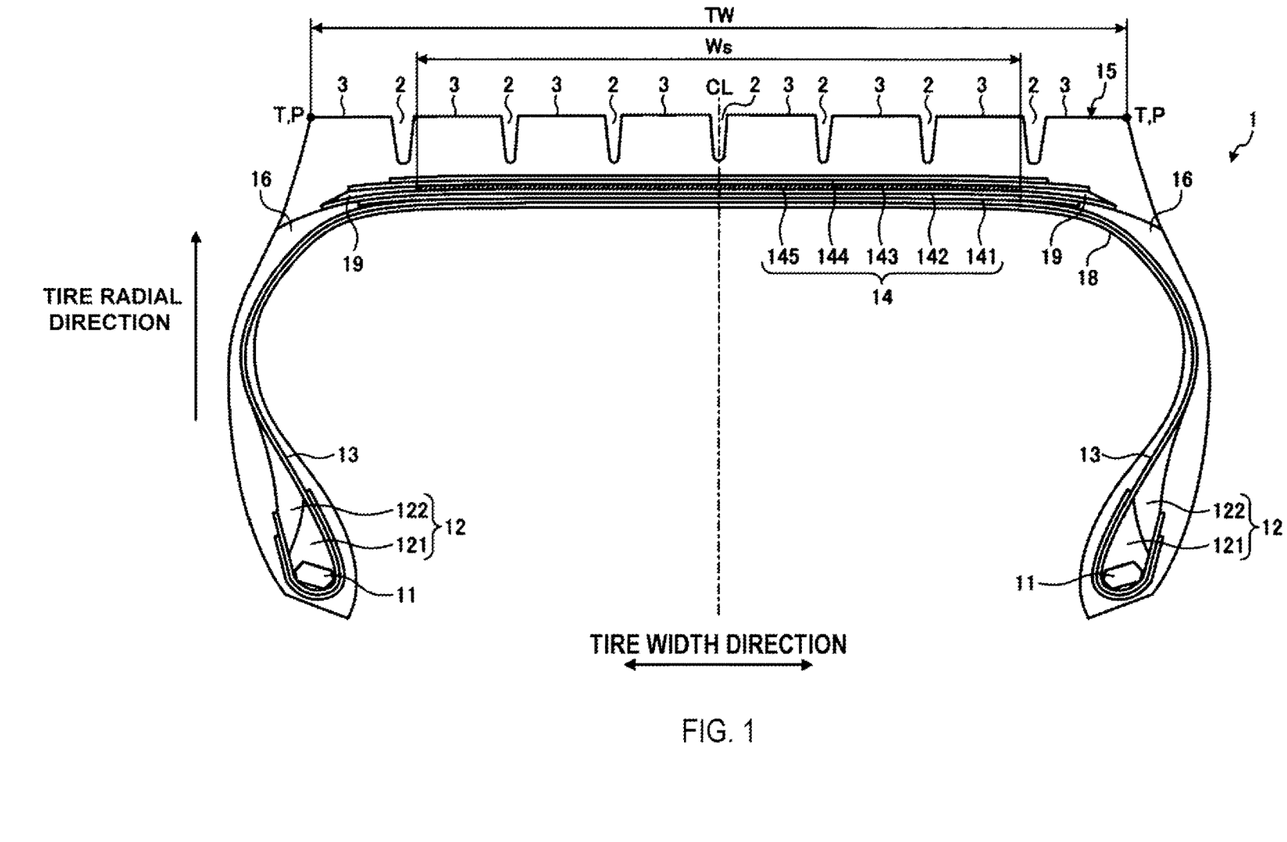
FIG. 1 is a cross-sectional view in a tire meridian direction illustrating a pneumatic tire according to an embodiment of the present technology.

FIG. 1 is a cross-sectional view in a tire meridian direction illustrating a pneumatic tire according to an embodiment of the present technology. In this drawing, a radial tire for heavy loads that is mounted on trucks, buses, and the like for long-distance transport is illustrated as an example of the pneumatic tire 1. Note that the symbol CL refers to a tire equatorial plane. Moreover, a tread edge P and a tire ground contact edge T are in accord with each other in FIG. 1. The circumferential reinforcing layer 145 in FIG. 1 is indicated by hatching.

The pneumatic tire 1 includes a pair of bead cores 11,11, a pair of bead fillers 12,12, a carcass layer 13, a belt layer 14, tread rubber 15, and a pair of side wall rubbers 16,16 (see FIG. 1).

The pair of bead cores 11,11 have annular structures and constitute cores of left and right bead portions. The pair of bead fillers 12,12 are formed from a lower filler 121 and an upper filler 122, and are disposed on an outer periphery of each of the pair of bead cores 11,11 in the tire radial direction so as to reinforce the bead portions.

The carcass layer 13 stretches between the left and right side bead cores 11 and 11 in toroidal form, forming a framework for the tire. Additionally, both end portions of the carcass layer 13 are folded from an inner side in a tire width direction toward an outer side in the tire width direction and fixed so as to wrap around the bead cores 11 and the bead fillers 12. Also, the carcass layer 13 is constituted by a plurality of carcass cords formed from steel or organic fibers (e.g. nylon, polyester, rayon, or the like) covered by a coating rubber and subjected to a rolling process, and has a carcass angle (inclination angle of the fiber direction of the carcass cords with respect to the tire circumferential direction), as an absolute value, of not less than 85° and not greater than 95°.

The belt layer 14 is formed by laminating a plurality of belt plies 141 to 145, and disposed extending over an outer periphery of the carcass layer 13. A detailed configuration of the belt layer 14 is described below.

The tread rubber 15 is disposed on an outer periphery in the tire radial direction of the carcass layer 13 and the belt layer 14, and forms a tread portion of the tire. The pair of sidewall rubbers 16,16 is disposed on both outer sides of the carcass layer 13 in the tire width direction, and form left and right sidewall portions of the tire.

In the configuration illustrated in FIG. 1, the pneumatic tire 1 includes seven circumferential main grooves 2 that extend in the tire circumferential direction, and eight land portions 3 partitioned and formed by the circumferential main grooves 2. The land portions 3 are formed of blocks that are segmented in the tire circumferential direction by ribs or lug grooves (not illustrated) that continue in the tire circumferential direction.

Here, "circumferential main grooves" refers to circumferential grooves having a groove width of 5.0 mm or greater. The groove width of the circumferential main grooves is measured excluding the notched portions and/or the chamfered portions formed at the groove opening portion.

Additionally, in the pneumatic tire 1, the outermost left and right circumferential main grooves 2, 2 in the tire width direction are referred to as outermost circumferential main grooves. Moreover, the left and right land portions 3, 3 on the outer side in the tire width direction that are defined by the left and right outermost circumferential main grooves 2, 2 are referred to as shoulder land portions.

[Belt Layer]

Figure 2:
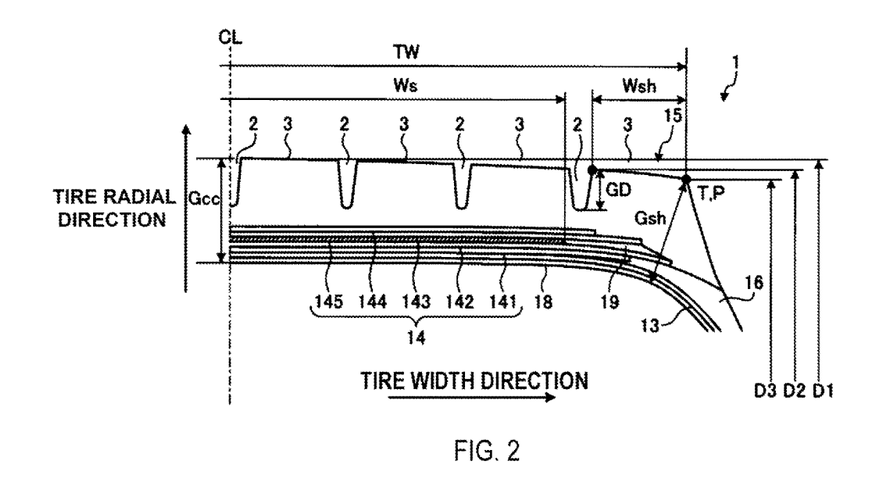
FIG. 2 is an explanatory view illustrating a belt layer of the pneumatic tire depicted in FIG. 1.
Figure 3:
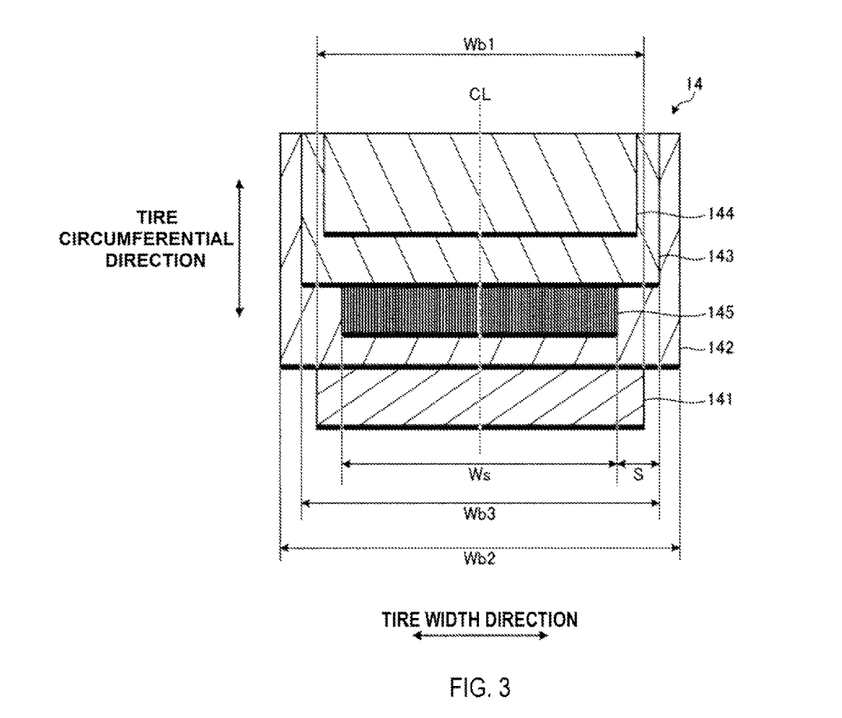
FIG. 3 is an explanatory view illustrating a belt layer of the pneumatic tire depicted in FIG. 1.

FIGS. 2 and 3 are explanatory views illustrating a belt layer of the pneumatic tire depicted in FIG. 1. In these drawings, FIG. 2 illustrates an area on one side of a tread portion demarcated by the tire equatorial plane CL, and FIG. 3 illustrates a laminated structure of the belt layer 14. Furthermore, the thin lines in the belt plies 141 to 145 in FIG. 3 schematically represent the respective belt cords of the belt plies 141 to 145.

The belt layer 14 is formed by laminating a large angle belt 141, a pair of cross belts 142, 143, a belt cover 144, and a circumferential reinforcing layer 145, and is disposed extending over the outer periphery of the carcass layer 13 (see FIG. 2).

The large angle belt 141 is configured by a plurality of belt cords formed from steel or organic fibers, covered by coating rubber, and subjected to a rolling process, having a belt angle (inclination angle of the fiber direction of the belt cords with respect to the tire circumferential direction), as an absolute value, of not less than 45° and not greater than 70°. Moreover, the large angle belt 141 is disposed laminated on the outer side of the carcass layer 13 in the tire radial direction.

The pair of cross belts 142, 143 are configured by a plurality of belt cords formed from steel or organic fibers, covered by coating rubber, and subjected to a rolling process, having a belt angle, as an absolute value, of not less than 10° and not greater than 45°. Additionally, the pair of cross belts 142, 143 have belt angles that are of mutually opposite signs, and are laminated such that the fiber directions of the belt cords intersect each other (a crossply configuration). Hereinafter, the cross belt 142 positioned on the inner side in the tire radial direction is referred to as "inner-side cross belt", and the cross belt 143 positioned on the outer side in the tire radial direction is referred to as "outer-side cross belt". Three or more cross belts may be disposed laminated (not illustrated). Moreover, in this embodiment, the pair of cross belts 142, 143 are disposed laminated on the outer side of the large angle belt 141 in the tire radial direction.

Also, the belt cover 144 is configured by a plurality of belt cords formed from steel or organic fibers, covered by coating rubber, and subjected to a rolling process, having a belt angle, as an absolute value, of not less than 10° and not greater than 45°. Moreover, the belt cover 144 is disposed laminated on the outer side of the cross belts 142, 143 in the tire radial direction. In this embodiment, the belt cover 144 has the same belt angle as the outer-side cross belt 143, and is disposed in the outermost layer of the belt layer 14.

The circumferential reinforcing layer 145 is configured by belt cords, formed from steel and covered by coating rubber, that are wound in a spiral manner with an inclination within a range of ±5° with respect to the tire circumferential direction. Moreover, in this embodiment, the circumferential reinforcing layer 145 is disposed interposed between the pair of cross belts 142, 143. Additionally, the circumferential reinforcing layer 145 is disposed further to the inner side in the tire width direction than left and right edge portions of the pair of cross belts 142, 143. Specifically, the circumferential reinforcing layer 145 is formed by winding one or a plurality of wires in a spiral manner around the outer periphery of the inner-side cross belt 142. This circumferential reinforcing layer 145 reinforces the rigidity in the tire circumferential direction. As a result, tire durability is improved.

In the pneumatic tire 1, the belt layer 14 may have an edge cover (not illustrated). Generally, the edge cover is configured by a plurality of belt cords formed from steel or organic fibers, covered by coating rubber, and subjected to a rolling process, having a belt angle, as an absolute value, of not less than 0° and not greater than 5°. Additionally, edge covers are disposed on the outer side of the left and right edge portions of the outer-side cross belt 143 (or the inner-side cross belt 142) in the tire radial direction. The edge covers improve the uneven wear resistance performance of the tire by reducing the difference in radial growth between the center area and the shoulder area of the tread portion, by exhibiting a hoop effect.

(Rib Tear Suppression Structure)

Recent heavy duty tires mounted on trucks, buses, and the like maintain the shape of the tread portion due to the tires having a low aspect ratio while having a circumferential reinforcing layer disposed in the belt layer. Specifically, by disposing the circumferential reinforcing layer at the tread center region, and exploiting the hoop effect thereof, radial growth of the tread is suppressed and the shape of the tread portion is maintained.

In such a configuration, rigidity of the tread portion becomes relatively low in the shoulder area of the tread portion where a circumferential reinforcing layer is not disposed. This results in the problem that tears tend to occur in the shoulder land portions.

Accordingly, the pneumatic tire 1 uses the following configuration to suppress the occurrence of tears in the shoulder land portions (see FIGS. 1 to 3).

As illustrated in FIG. 2, in the pneumatic tire 1, a distance Gcc from the tread profile to the tire inner circumferential surface along the tire equatorial plane CL and a distance Gsh from the tread edge P to the tire inner circumferential surface have a relationship satisfying 1.10≤Gsh/Gcc. In particular, as shown by the results of performance testing described below (see FIG. 9), this ratio Gsh/Gcc is preferably within a range of 1.20≤Gsh/Gcc. This results in effective improvement of tear resistance performance of the tire.

On the other hand, the upper limit of the ratio Gsh/Gcc is not particularly limited, but when the tire is assembled on a specified rim, inflated to a specified internal pressure, and is in an unloaded state, the radius at the tread edge P of the tread profile is preferably less than or equal to the radius along the tire equatorial plane CL. That is, the tread profile has a linear shape or an arc shape having a center on the inner side in the tire radial direction, and is configured so as not to have a reverse R shape (arc shape having a center on the outer side in the tire radial direction). For example, in a configuration having a square shaped shoulder portion as in FIG. 2, the upper limit of the ratio Gsh/Gcc is approximately from 1.4 to 1.5. On the other hand, in a configuration having a round shaped shoulder portion as in FIG. 6, the upper limit of the ratio Gsh/Gcc is approximately from 1.3 to 1.4.

The distance Gcc is measured as the distance from the intersection between the tire equatorial plane CL and the tread profile to the intersection between the tire equatorial plane CL and the tire inner circumferential surface when viewed as a cross-section from the tire meridian direction. Therefore, in a configuration having a circumferential main groove 2 at the tire equatorial plane CL such as the configuration illustrated in FIG. 1 and FIG. 2, the distance Gcc is measured omitting the circumferential main groove 2. The distance Gsh is measured as the length of a perpendicular line from the tread edge P to the tire inner circumferential surface when viewed as a cross-section from the tire meridian direction.

In the configuration illustrated in FIG. 2, the pneumatic tire 1 includes an inner liner 18 on the inner circumferential surface of the carcass layer 13, and the inner liner 18 is disposed across the entire region of the tire inner circumferential surface. In such a configuration, the distance Gcc and the distance Gsh are measured on the basis of the outer surface of the inner liner 18 (tire inner circumferential surface).

The tread edge P (1) refers to a point of the shoulder edge portion in a configuration having a square shaped shoulder portion. For example, in the configuration illustrated in FIG. 2, the tread edge P and a tire ground contact edge T coincide with each other due to the shoulder portion having a square shape. Conversely, (2) in a configuration having the round shaped shoulder portion, as illustrated in the modified example of FIG. 6 described below, taking an intersection P' between the tread portion profile and the side wall portion profile when viewed as a cross-section from the tire meridian direction, the tread edge P is taken as the bottom of a perpendicular line drawn from the intersection P' to the shoulder portion.

Additionally, the "tire ground contact edge T" refers to the maximum width position in a tire axial direction of a contact surface between the tire and a flat plate in a configuration in which the tire is assembled on a specified rim, inflated to a specified internal pressure, placed perpendicularly to the flat plate in a static state, and loaded with a load corresponding to a specified load.

Herein, "specified rim" refers to an "applicable rim" stipulated by the Japan Automobile Tyre Manufacturers Association (JATMA), a "design rim" defined by the Tire and Rim Association (TRA), or a "measuring rim" defined by the European Tyre and Rim Technical Organisation (ETRTO). "Specified internal pressure" refers to "maximum air pressure" stipulated by JATMA, a maximum value in "tire load limits at various cold inflation pressures" stipulated by TRA, and "inflation pressures" stipulated by ETRTO. Note that "specified load" refers to "maximum load capacity" stipulated by JATMA, a maximum value in "tire load limits at various cold inflation pressures" stipulated by TRA, and "load capacity" stipulated by ETRTO. However, with JATMA, in the case of passenger car tires, the specified internal pressure is an air pressure of 180 kPa, and the specified load is 88% of the maximum load capacity.

Figure 4A:
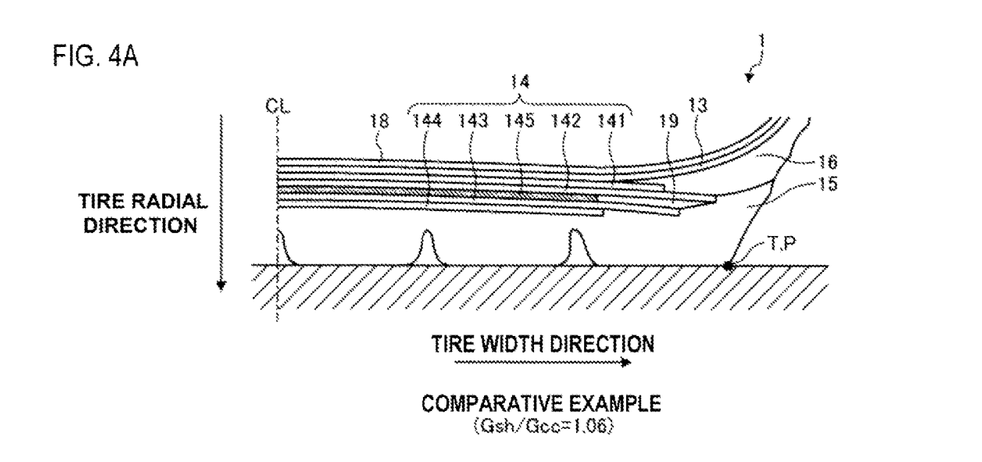
FIGS. 4A and 4B are explanatory views illustrating the effect of the pneumatic tire depicted in FIG. 1.
Figure 4B:
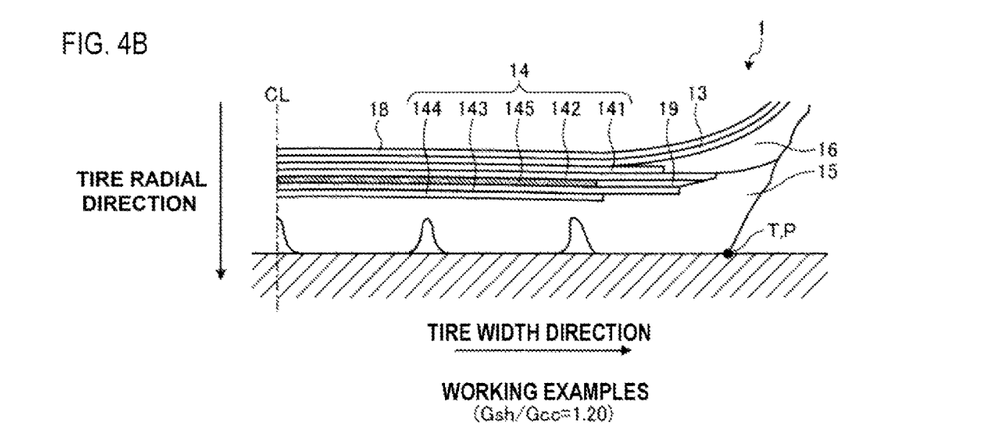
Figure 5:
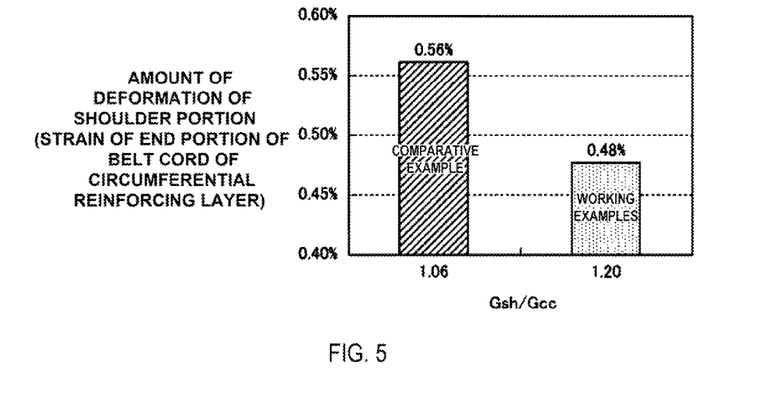
FIG. 5 is an explanatory view illustrating the effect of the pneumatic tire depicted in FIG. 1.

FIGS. 4A, 4B, and 5 are explanatory views illustrating the operation of the pneumatic tire depicted in FIG. 1. In these drawings, FIGS. 4A and 4B illustrate the states of ground contact of tires having mutually different ratios Gsh/Gcc, and FIG. 5 illustrates the amounts of deformation of the shoulder portion at the time of ground contact (strain at end portions of belt cord of the circumferential reinforcing layer 145) of each of the tires of FIGS. 4A and 4B.

In the tire of a comparative example of FIG. 4A, in the configurations of FIGS. 1 to 3, the ratio Gsh/Gcc is set to a small value (Gsh/Gcc=1.06). For this reason, when the tire does not contact the ground, the tread profile has a counterbore shape in which the outside diameter decreases from the tire equatorial plane CL toward the tread edge P (not illustrated). Thus, when the tire contacts the ground, as illustrated in FIG. 4A, the tread rubber 15 on the shoulder portion deforms greatly on the road surface side (outer side in the tire radial direction), and each of the belt plies 141 to 145 of the belt layer 14 curves greatly on the road surface side (outer side in the tire radial direction) toward the outer side in the tire width direction. For this reason, tears tend to occur in the shoulder land portions.

In contrast, in the tire of a working example of FIG. 4B, in the configurations of FIGS. 1 to 3, the ratio Gsh/Gcc is set to a large value (Gsh/Gcc=1.20). For this reason, when the tire does not contact the ground, the difference in diameter between the outside diameter of the tread profile along the tire equatorial plane CL and the outside diameter at the tread edge P is small, and as a whole, the tread face has a flat (substantially parallel to the tire rotational axis) shape (see FIGS. 1 and 2). Furthermore, the volume (distance Gsh) of the tread rubber 15 at the shoulder portion is assured, and rigidity of the shoulder land portion 3 is assured. For this reason, the amount of deformation of the shoulder portion when the tire contacts the ground is reduced (see FIG. 5), and the occurrence of tears in the shoulder land portion 3 is suppressed.

Furthermore, in this pneumatic tire 1, in FIG. 2, the outside diameter D1 of the tread profile along the tire equatorial plane CL, the outside diameter D2 of the tread profile at the edge portion on the inner side of the shoulder land portion 3 in the tire width direction, and the outside diameter D3 of the tread profile at the tread edge P have a relationship satisfying D1>D2, D1>D3, and −0.65≤(D2−D3)/(D1−D3)≤0.85. That is, the ratio (D2−D3)/(D1−D3) of the amount of counterbore of the tread profile in the region from the tire equatorial plane CL to the tread edge P (D1−D3) and the amount of counterbore of the tread profile at the shoulder land portion 3 (D2−D3) is made appropriate within a prescribed range. As a result, deformation of the shoulder portion when the tire contacts the ground is effectively suppressed, and rigidity of the shoulder portion is properly assured.

The outside diameters D1 to D3 of the tread profile are the radii at each location of the tread profile, and are measured when the tire is assembled on a specified rim, inflated to a specified internal pressure, and is in an unloaded state.

Here, in the configuration of FIG. 2, the outside diameters D1 to D3 at each location of the tread profile have a relationship satisfying D1>D2>D3. Therefore, the ratio (D2−D3)/(D1−D3) is in the range of 0<(D2−D3)/(D1−D3), and the outside diameter of the tread profile continuously decreases monotonically toward the outer side in the tire width direction. Such a configuration is preferred particularly because the shape of the tread profile at the shoulder portion is made appropriate and rigidity of the shoulder portion is properly assured.

However, the configuration is not limited thereto, and the outside diameters D1 to D3 at each location of the tread profile may have a relationship satisfying D1>D3>D2 (not illustrated). That is, the ratio (D2−D3)/(D1−D3) is in the range of 0>(D2−D3)/(D1−D3), and, when viewed as a cross-section from the tire meridian direction, the shoulder land portion 3 may have a shape that gradually rises from the edge portion on the outermost circumferential main groove 2 side toward the tread edge P.

Also, in the configuration of FIG. 2, it is preferred that the outside diameters D1 to D3 at each location of the tread profile have a relationship satisfying 7 mm≤D1−D3≤14 mm and −4 mm≤D2−D3≤5 mm. As a result, the shape of the tread profile at the shoulder portion is made appropriate.

Additionally, in FIG. 1, the tread width TW and the width Ws of the circumferential reinforcing layer 145 preferably have a relationship satisfying 0.70≤Ws/TW≤0.90.

The tread width TW is the distance from the left to the right tread edges P, P, in the tire rotational axis direction measured when the tire is assembled on a specified rim, inflated to a specified internal pressure, and is in an unloaded state.

The width Ws of the circumferential reinforcing layer 145 is the distance from the left to the right end portions of the circumferential reinforcing layer 145 in the tire rotational axis direction measured when the tire is assembled on a specified rim, inflated to a specified internal pressure, and is in an unloaded state. The width Ws of the circumferential reinforcing layer 145 is the distance between the outermost end portions of the divided portions, inclusive, when the circumferential reinforcing layer 145 has a structure that is divided in the tire width direction (not illustrated).

Moreover, a typical pneumatic tire has a left-right symmetrical structure centered on the tire equatorial plane CL, as illustrated in FIG. 1. As a result, the distance from the tire equatorial plane CL to the tread edge P is TW/2, and the distance from the tire equatorial plane CL to the circumferential reinforcing layer 145 is Ws/2.

In contrast, in a pneumatic tire having a left-right asymmetrical structure (not illustrated), the range of the above-mentioned ratio Ws/TW of the width Ws of the circumferential reinforcing layer 145 and the tread width TW is stipulated in terms of half-width based on the tire equatorial plane CL. Specifically, the distance TW' (not illustrated) from the tire equatorial plane CL to the tread edge P and the distance Ws' (not illustrated) from the tire equatorial plane CL to the end portion of the circumferential reinforcing layer 145 are set satisfying the relationship 0.70≤Ws'/TW'≤0.90.

Furthermore, in FIG. 2, the ground contact width Wsh of the shoulder land portion 3 and the groove depth GD of the outermost circumferential main groove 2 have a relationship satisfying 1.5≤Wsh/GD≤4.0.

The ground contact width Wsh of the shoulder land portion 3 is the distance in the tire rotational axis direction from the edge portion of the shoulder land portion 3 on the outermost circumferential main groove 2 side to the tire ground contact edge T measured when the tire is assembled on a specified rim, inflated to a specified internal pressure, and is in an unloaded state. Furthermore, in a configuration in which the outermost circumferential main grooves 2 have a shape that extends in a zigzag shape in the tire circumferential direction or a configuration in which the outermost circumferential main grooves 2 have a notched portion or chamfered portion on the edge portions, the ground contact width Wsh is calculated as the average around the entire circumference of the tire.

The groove depth GD of the outermost circumferential main grooves 2 is measured excluding raised bottom portions such as stone ejectors formed on the groove bottom.

Additionally, in FIG. 2, the ground contact width Wsh of the shoulder land portion 3 and the tread width TW have a relationship satisfying 0.1≤Wsh/TW≤0.2. As a result, the ground contact width Wsh of the shoulder land portion 3 is made appropriate.

Furthermore, the groove wall angle θ (not illustrated) of the outermost circumferential main groove 2 on the shoulder land portion 3 side is preferably in the range of 4°≤θ. The upper limit of the groove wall angle θ is not particularly limited, but is constrained by the groove depth, groove width, groove wall shape, and the like of the outermost circumferential main groove 2.

The groove wall angle θ, when viewed as a cross-section from the tire meridian direction, is the angle formed by the groove wall plane and a straight line perpendicular to the road contact surface of the shoulder land portion 3 passing through the edge portion of the shoulder land portion 3 on the outermost circumferential main groove 2 side. In a configuration in which the shoulder land portion 3 has a C chamfered portion or an R chamfered portion at the edge portion, the groove wall angle θ is measured excluding these chamfered portions (the intersection between the extension line of the tread profile and the extension line of the groove wall plane is assumed to be the edge portion of the shoulder land portion 3).

The groove wall angle θ is measured in a state where the tire is assembled on a specified rim, inflated to a specified internal pressure, and is in an unloaded state. In this case, the following measurement method is, for example, used. First, a tire unit is applied to the imaginary line of a tire profile measured by a laser profiler and fixed with tape or the like. Then, the gauge to be measured is measured with a caliper or the like. The laser profiler used here is a tire profile measuring device (manufactured by Matsuo Co., Ltd.).

Furthermore, in the pneumatic tire 1, the width Wb1 of the large angle belt 141 and the width Wb3 of the narrower cross belt 143 of the pair of cross belts 142, 143 preferably have a relationship satisfying 0.85≤Wb1/Wb3≤1.05 (see FIG. 3). As a result, the ratio Wb1/Wb3 is made appropriate.

The width Wb1 of the large angle belt 141 and the width Wb3 of the cross belt 143 are measured as the distance in the tire width direction when the tire is assembled on a specified rim, inflated to a specified internal pressure, and is in an unloaded state.

In the configuration of FIG. 1, the belt layer 14 has a structure with left-right symmetry centered on the tire equatorial plane CL as illustrated in FIG. 3, and the width Wb1 of the large angle belt 141 and the width Wb3 of the narrower cross belt 143 have a relationship satisfying Wb1<Wb3. As a result, edge portions of the large angle belt 141 are disposed further to an inner side in the tire width direction than the edge portions of the narrower cross belt 143 in a region on one side of the tire equatorial plane CL. However, the configuration is not limited thereto, and the width Wb1 of the large angle belt 141 and the width Wb3 of the narrower cross belt 143 may have a relationship satisfying Wb1≥Wb3 (not illustrated).

Moreover, the belt cords of the large angle belt 141 are preferably steel wire, and the large angle belt 141 preferably has the number of ends of not less than 15 ends/50 mm and not greater than 25 ends/50 mm (see FIGS. 4A and 4B). Moreover, the belt cords of the pair of cross belts 142, 143 are preferably steel wire, and the pair of cross belts 142, 143 preferably have the number of ends of not less than 18 ends/50 mm and not greater than 28 ends/50 mm. Also, the belt cords that constitute the circumferential reinforcing layer 145 are preferably steel wire, and the circumferential reinforcing layer 145 preferably has the number of ends of not less than 17 ends/50 mm and not greater than 30 ends/50 mm. As a result, the strengths of the belt plies 141, 142, 143, 145 are properly assured.

Moreover, a modulus E1 at 100% elongation of the coating rubber of the large angle belt 141 and a modulus Es at 100% elongation of the coating rubber of the circumferential reinforcing layer 145 preferably have a relationship satisfying 0.90≤Es/E1≤1.10 (see FIGS. 4A and 4B). Moreover, moduli E2, E3 at 100% elongation of the coating rubbers of the pair of cross belts 142, 143, and the modulus Es at 100% elongation of the coating rubber of the circumferential reinforcing layer 145 preferably have a relationship satisfying 0.90≤Es/E2≤1.10 and 0.90≤Es/E3≤1.10. Moreover, the modulus Es at 100% elongation of the coating rubber of the circumferential reinforcing layer 145 is preferably within the range of 4.5 MPa≤Es≤7.5 MPa. As a result, the moduli of the belt plies 141, 142, 143, 145 are made appropriate.

The modulus at 100% elongation is measured by a tensile test at ambient temperature in conformance with JIS K6251 (using dumbbell no. 3).

Moreover, a breaking elongation λ1 of the coating rubber of the large angle belt 141 is preferably in the range of λ1≥200% (see FIGS. 4A and 4B). Moreover, breaking elongations λ2, λ3 of the coating rubbers of the pair of cross belts 142, 143 are preferably in the range of λ2≥200% and λ3≥200%. Furthermore, a breaking elongation λs of the coating rubber of the circumferential reinforcing layer 145 is preferably in the range of λs≥200%. As a result, the durability of the belt plies 141 142, 143, 145 is properly assured.

Breaking elongation is measured by performing a tensile test on a JIS-K7162 stipulated 1B shape (dumb bell shape with a thickness of 3 mm) test sample using a tensile tester (INSTRON5585H manufactured by Instron Corp.) at a pulling speed of 2 mm/min in accordance with JIS-K7161.

The elongation of the belt cords that constitute the circumferential reinforcing layer 145, when the belt cords are components, is preferably not less than 1.0% and not greater than 2.5% when subjected to a tensile load of from 100 N to 300 N, and when the belt cords are of a tire (belt cords removed from a tire), the elongation is preferably not less than 0.5% and not greater than 2.0% when the tensile load is from 500 N to 1000 N. The belt cords (high elongation steel wire) have good elongation ratio when a low load is applied compared with normal steel wire, so they can withstand the loads that are applied to the circumferential reinforcing layer 145 during the time from manufacture until the tire is used, so it is possible to suppress damage to the circumferential reinforcing layer 145, which is preferable.

The elongation of the belt cord is measured in accordance with JIS G3510.

Also, as illustrated in FIG. 3, the circumferential reinforcing layer 145 is preferably disposed further to the inner side in the tire width direction than the left and right edge portions of the narrower cross belt 143 of the pair of cross belts 142, 143. Also, preferably, the width Wb3 of the narrower cross belt 143 and the distance S from the edge portion of the circumferential reinforcing layer 145 to the edge portion of the narrower cross belt 143 are within the range of 0.03≤S/Wb3≤0.12. As a result, the distance between the end portions of the width Wb3 of the cross belt 143 and the end portions of the circumferential reinforcing layer 145 are properly assured. This point is the same even if the circumferential reinforcing layer 145 has a divided structure (not illustrated).

The distance S of the circumferential reinforcing layer 145 is measured as a distance in the tire width direction when the tire is assembled on a specified rim, inflated to a specified internal pressure, and is in an unloaded state.

Further, in the configuration of FIG. 1, the circumferential reinforcing layer 145 is constituted by a single steel wire wound in a spiral manner, as illustrated in FIG. 3. However, the configuration is not limited thereto, and the circumferential reinforcing layer 145 may also be configured by a plurality of wires wound in a spiral manner side-by-side to each other (multiplexed wound structure). In this case, preferably, the number of wires is 5 or less. Additionally, the width of winding per unit when five wires are wound in a multiplexed manner is preferably not greater than 12 mm. As a result, a plurality of wires (not less than 2 and not greater than 5 wires) can be wound properly at a slant within a range of ±5° with respect to the tire circumferential direction.

Additionally, in the configuration of FIG. 2, the circumferential reinforcing layer 145 is disposed interposed between the pair of cross belts 142, 143 (see FIG. 2). However, the circumferential reinforcing layer 145 is not limited as such, and may also be disposed on the outer side of the pair of cross belts 142, 143 in the tire radial direction (not illustrated). Additionally, the circumferential reinforcing layer 145 may also be disposed on the inner side of the pair of cross belts 142, 143. For example, the circumferential reinforcing layer 145 may be (1) disposed between the large angle belt 141 and the inner-side cross belt 142, or (2) disposed between the carcass layer 13 and the large angle belt 141 (not illustrated).

Additionally, in the pneumatic tire 1, the breaking elongation of the tread rubber 15 is preferably not less than 350%. This results in the strength of the tread rubber 15 being assured and the occurrence of tears in the shoulder land portion 3 being suppressed. Further, the upper limit of the breaking elongation of the tread rubber 15 is not specifically limited, but is constrained by the type of rubber compound of the tread rubber 15.

Furthermore, in the pneumatic tire 1, the hardness of the tread rubber 15 is preferably not greater than 70. This results in the strength of the tread rubber 15 being assured and the occurrence of tears in the shoulder land portion 3 being suppressed. Further, the upper limit of the hardness of the tread rubber 15 is not specifically limited, but is constrained by the type of rubber compound of the tread rubber 15.

Here, "rubber hardness" refers to JIS-A hardness in accordance with JIS-K6263.

[Round Shaped Shoulder Portion]

Figure 6:
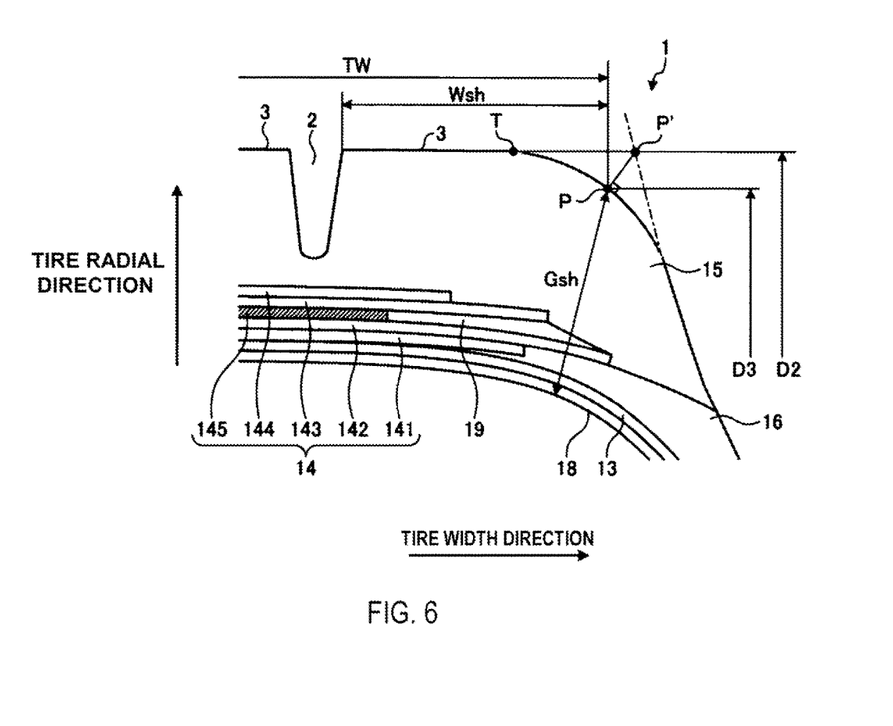
FIG. 6 is an explanatory view illustrating a modified example of the pneumatic tire depicted in FIG. 1.

FIG. 6 is an explanatory view illustrating a modified example of the pneumatic tire depicted in FIG. 1. FIG. 6 illustrates a configuration having a shoulder portion with a round shape.

In the configuration of FIG. 1, the shoulder portion has a square shape, in which the tire ground contact edge T and tread edge P are in accord, as illustrated in FIG. 2.

However, the shoulder portion is not limited as such, and may also have a round shape, as illustrated in FIG. 6. In such a case, an intersection P' is taken from the tread portion profile and the side wall portion profile when viewed as a cross-section from the tire meridian direction, and the tread edge P is taken as the bottom of a perpendicular line drawn from the intersection P' to the shoulder portion. Therefore, the tire ground contact edge T and the tread edge P normally are in mutually different locations.

[Belt Edge Cushion Two-Color Structure]

Figure 7:
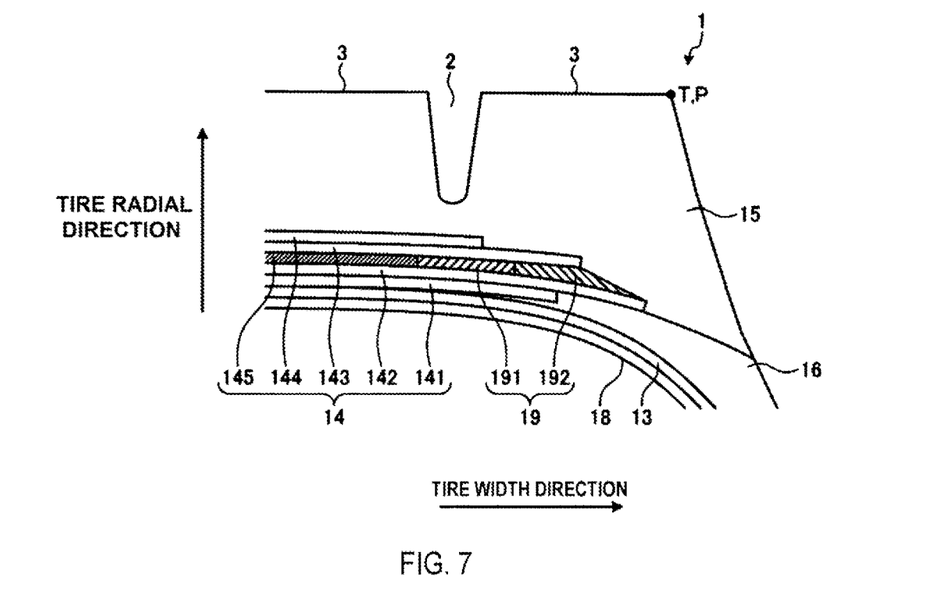
FIG. 7 is an explanatory view illustrating a modified example of the pneumatic tire depicted in FIG. 1.

FIG. 7 is an explanatory view illustrating a modified example of the pneumatic tire depicted in FIG. 1. FIG. 7 is an enlarged view of an end portion of the outer side of the belt layer 14 in the tire width direction. The circumferential reinforcing layer 145 and the belt edge cushion 19 in FIG. 7 are indicated by hatching.

In the configuration illustrated in FIG. 1, the circumferential reinforcing layer 145 is disposed further to the inner side in the tire width direction than the left and right edge portions of the narrower cross belt 143 of the pair of cross belts 142, 143. The belt edge cushion 19 is disposed interposed between the pair of cross belts 142, 143 at a position corresponding to the edge portion of the pair of cross belts 142, 143. Specifically, the belt edge cushion 19 is disposed on the outer side of the circumferential reinforcing layer 145 in the tire width direction adjacent to the circumferential reinforcing layer 145, and extends from the end portion on the outer side of the circumferential reinforcing layer 145 in the tire width direction to the end portion on the outer side of the pair of cross belts 142, 143 in the tire width direction.

In the configuration illustrated in FIG. 1, the belt edge cushion 19 has a structure that is thicker as a whole than the circumferential reinforcing layer 145 due to the thickness increasing toward the outer side in the tire width direction. The belt edge cushion 19 has a modulus E at 100% elongation that is lower than the coating rubber of the cross belts 142, 143. Specifically, the modulus E at 100% elongation of the belt edge cushion 19 and a modulus Eco of the coating rubber have a relationship satisfying $0.60 \leq E/Eco \leq 0.95$. As a result, the occurrence of separation of rubber materials between the pair of cross belts 142, 143 and also in a region on the outer side of the circumferential reinforcing layer 145 in the tire width direction is suppressed.

Conversely, according to the configuration illustrated in FIG. 7, the belt edge cushion 19 in the configuration illustrated in FIG. 1 has a two-color structure composed of a stress relief rubber 191 and an end portion relief rubber 192. The stress relief rubber 191 is disposed between the pair of cross belts 142, 143 on the outer side of the circumferential reinforcing layer 145 in the tire width direction, adjacent to the circumferential reinforcing layer 145. The end portion relief rubber 192 is disposed between the pair of cross belts 142, 143 on the outer side of the stress relief rubber 191 in the tire width direction at a position corresponding to the edge portion of the pair of cross belts 142, 143, adjacent to the stress relief rubber 191. Therefore, when viewed as a cross-section from the tire meridian direction, the belt edge cushion 19 has a structure composed by the stress relief rubber 191 and the end portion relief rubber 192 disposed consecutively in the tire width direction, filling a region from the end portion of the outer side of the circumferential reinforcing layer 145 in the tire width direction to the edge portion of the pair of cross belts 142, 143.

Additionally, in the configuration of FIG. 7, a modulus Ein at 100% elongation of the stress relief rubber 191 and the modulus Es at 100% elongation of the coating rubber of the circumferential reinforcing layer 145 have a relationship satisfying Ein<Es. Specifically, the modulus Ein of the stress relief rubber 191 and the modulus Es of the circumferential reinforcing layer 145 preferably have a relationship satisfying $0.6 \leq Ein/Es \leq 0.9$.

Moreover, in the configuration of FIG. 7, a modulus Ein at 100% elongation of the stress relief rubber 191 and the modulus Eco at 100% elongation of the coating rubber of the cross belts 142, 143 have a relationship satisfying Ein<Eco. Specifically, the modulus Ein of the stress relief rubber 191 and the modulus Eco of the coating rubber preferably have a relationship satisfying $0.6 \leq Ein/Eco \leq 0.9$.

Additionally, in the configuration of FIG. 7, a modulus Eout at 100% elongation of the end portion relief rubber 192 and the modulus Ein at 100% elongation of the stress relief rubber 191 preferably have a relationship satisfying Eout<Ein. Additionally, the modulus Ein at 100% elongation of the stress relief rubber 191 preferably is within a range of $4.0 \text{ MPa} \leq Ein \leq 5.5 \text{ MPa}$.

In the configuration of FIG. 7, since the stress relief rubber 191 is disposed on the outer side of the circumferential reinforcing layer 145 in the tire width direction, shearing strain of the peripheral rubbers between the edge portion of the circumferential reinforcing layer 145 and the cross belts 142, 143 is alleviated. Moreover, since the end portion relief rubber 192 is disposed at a position corresponding to the edge portions of the cross belts 142, 143, shearing strain of the periphery rubbers at the edge portions of the cross belts 142, 143 is alleviated. Accordingly, separation of the periphery rubber of the circumferential reinforcing layer 145 is suppressed.

[Groove Wall Shape of Circumferential Main Grooves]

Figure 8:
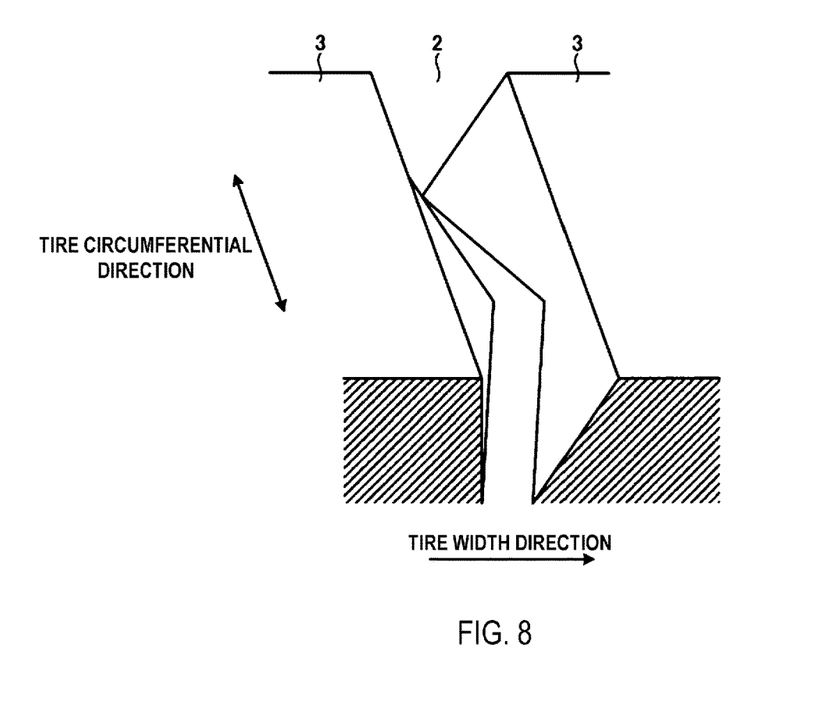
FIG. 8 is an explanatory view illustrating a modified example of the pneumatic tire depicted in FIG. 1.

FIG. 8 is an explanatory view illustrating a modified example of the pneumatic tire depicted in FIG. 1. FIG. 8 illustrates a perspective cross-sectional view of the groove wall shape of the outermost circumferential main groove 3. Furthermore, in FIG. 8, hatching has been added to the cross-section of the land portion 3.

In this pneumatic tire 1, as illustrated in FIG. 8, the outermost circumferential main grooves 2 preferably have a straight shape at the groove opening portion and have a zigzag shape at the groove bottom portion. As a result, rigidity of the adjacent land portions 3, 3 is increased, and occurrence of tears in the shoulder land portion is suppressed.

For example, in the configuration of FIG. 8, the groove opening portions of the outermost circumferential main grooves 2 have a shape that extends linearly in the tire circumferential direction. Also, the groove bottom portions of the outermost circumferential main grooves 2 having a predetermined groove width which is narrower than that of the groove opening portion, have a shape extending in a zigzag shape in the tire circumferential direction having an amplitude in the tire width direction. Additionally, the groove opening portion and the groove bottom portion are connected such that the left and right land portions 3, 3 have a trapezoidal cross-section when viewed as a cross-section from the tire meridian direction. As a result, the rigidity of the left and right land portions 3, 3 is increased.

Effect

As described above, the pneumatic tire 1 includes a carcass layer 13, a belt layer 14 disposed on the outer side of the carcass layer 13 in the tire radial direction, and a tread rubber 15 disposed on the outer side of the belt layer 14 in the tire radial direction (see FIG. 1). Moreover, the belt layer 14 is formed by laminating the pair of cross belts 142, 143 having a belt angle, as an absolute value, of not less than 10° and not greater than 45° and having belt angles of mutually opposite signs, and the circumferential reinforcing layer 145 having a belt angle within a range of ±5° with respect to the tire circumferential direction (see FIG. 3). Moreover, the distance Gcc from the tread profile to the tire inner circumferential surface along the tire equatorial plane CL and the distance Gsh from the tread edge P to the tire inner circumferential surface have a relationship satisfying $1.10 \leq Gsh/Gcc$ (see FIG. 2). Furthermore, the outside diameter D1 of the tread profile along the tire equatorial plane CL, the outside diameter D2 of the tread profile at the edge portion on the inner side of the shoulder land portion in the tire width direction, and the outside diameter D3 of the tread profile at the tread edge have a relationship satisfying $D1>D2$, $D1>D3$, and $-0.65 \leq (D2-D3)/(D1-D3) \leq 0.85$.

In such a configuration, (1) because the ratio Gsh/Gcc is set to a high value, the tread face as a whole has a flat (substantially parallel to the tire rotational axis) shape, and further, the volume of the tread rubber 15 (distance Gsh) at the shoulder portion is assured (see FIGS. 1 and 2). As a result, the amount of deformation of the shoulder portion when the tire contacts the ground is reduced, and rigidity of the shoulder land portion 3 is properly assured. Furthermore, (2) because the relationships among the outside diameters D1 to D3 at each location of the tread profile is made appropriate, the amount of deformation of the shoulder portion when the tire contacts the ground is further reduced. As a result, there is an advantage that the occurrence of tears in the shoulder land portion 3 is effectively suppressed.

Moreover, (3) according to the above configurations (1) and (2), the amount of deformation of the shoulder portion when the tire contacts the ground is reduced, and strain on each of the belt plies 141 to 145 is reduced (see FIG. 5). As a result, there are advantages that the occurrence of separation of the peripheral rubber of the end portions of each of the belt plies 141 to 145 is suppressed, and the occurrence of separation of the coating rubber between adjacent belt plies 141 to 145 is suppressed.

Additionally, in the pneumatic tire 1, the tread width TW and the width Ws of the circumferential reinforcing layer 145 have a relationship satisfying $0.70 \leq Ws/TW \leq 0.90$ (see FIGS. 1 and 2). In such a configuration, due to the ratio Ws/TW between the tread width TW and the width Ws of the circumferential reinforcing layer 145 being made appropriate, there is an advantage that the amount of deformation of the shoulder land portion 3 when the tire contacts the ground is effectively reduced (see FIG. 4B and FIG. 5). That is, by satisfying the relationship $0.70 \leq Ws/TW$, the width Ws of the circumferential reinforcing layer 145 is appropriately assured and the amount of deformation of the shoulder land portion 3 when the tire contacts the ground is reduced. Also, by satisfying the relationship $Ws/TS \leq 0.90$, due to the deformation of the end portions of each of the belt plies when the tire contacts the ground being suppressed, the amount of deformation of the shoulder portion is reduced, and the occurrence of tears at the shoulder land portion 3 is suppressed.

Further, in this pneumatic tire 1, the ground contact width Wsh of the shoulder land portions 3 and the groove depth GD of the outermost circumferential main grooves 2 have a relationship satisfying $1.5 \leq Wsh/GD \leq 4.0$ (see FIG. 2). There is an advantage that the ratio Wsh/GD between the ground contact width Wsh of the shoulder land portions 3 and the groove depth GD of the outermost circumferential main grooves 2 is made appropriate. That is, by satisfying the relationship $1.5 \leq Wsh/GD$, rigidity of the shoulder land portion 3 is appropriately assured and tear resistance of the tire is improved. Additionally, if Wsh/GD is greater than 4.0, it is not preferable because the ground contact width Wsh of the shoulder land portion 3 becomes excessively large, and the shoulder land portion 3 becomes located outside the region where the circumferential reinforcing layer 145 is disposed, and as a result, an increase in the rigidity of the shoulder land portion 3 cannot be expected.

Further, in this pneumatic tire 1, the ground contact width Wsh of the shoulder land portion 3 and the tread width TW have a relationship satisfying $0.1 \leq Wsh/TW \leq 0.2$ (see FIG. 2). With such a configuration, there is an advantage that the ground contact width Wsh of the shoulder land portion 3 is made appropriate. That is, by satisfying the relationship $0.1 \leq Wsh/TW$, rigidity of the shoulder land portion 3 is assured and tear resistance of the tire is improved. Additionally, if Wsh/TW is greater than 0.2, it is not preferable because the ground contact width Wsh of the shoulder land portion 3 becomes excessively large, and the shoulder land portion 3 becomes located outside the region where the circumferential reinforcing layer 145 is disposed, and as a result, an increase in the rigidity of the shoulder land portion 3 cannot be expected.

Furthermore, in this pneumatic tire 1, the groove wall angle θ (not illustrated) of the outermost circumferential main grooves 2 on the shoulder land portion 3 side is in the range of $4° \leq θ$. As a result, there is an advantage that rigidity of the shoulder land portion 3 is appropriately assured and tear resistance of the tire is improved.

Moreover, in the pneumatic tire 1, the outermost circumferential main grooves 2 have a straight shape at the groove opening portion and have a zigzag shape at the groove bottom portion (see FIG. 8). As a result, there is an advantage that rigidity of the left and right land portions 3, 3 that sandwich the outermost circumferential main groove 2 is assured and the occurrence of tears in the shoulder land portion 3 is suppressed.

Additionally, in the pneumatic tire 1, the breaking elongation of the tread rubber 15 is not less than 350%. As a result, there is an advantage that the strength of the tread rubber 15 is assured and the occurrence of tears in the shoulder land portion 3 is suppressed.

Also, in the pneumatic tire 1, the belt cords of the circumferential reinforcing layer 145 are steel wire, and the circumferential reinforcing layer 145 has the number of ends of not less than 17 ends/50 mm and not greater than 30 ends/50 mm. As a result, there is an advantage that the number of ends of the belt cords of the circumferential reinforcing layer 145 is made appropriate. Specifically, the strength of the circumferential reinforcing layer 145 is properly assured due to the circumferential reinforcing layer 145 having at least 17 ends/50 mm. Moreover, the amount of rubber of the coating rubber of the circumferential reinforcing layer 145 is properly assured and separation of the rubber materials between the adjacent belt plies (the pair of cross belts 142, 143 and the circumferential reinforcing layer 145 in FIG. 3) is suppressed due to the circumferential reinforcing layer 145 having not greater than 30 ends/50 mm.

In the pneumatic tire 1, the elongation of the belt cords that constitute the circumferential reinforcing layer 145, when the belt cords are components, is not less than 1.0% and not greater than 2.5% when the tensile load is from 100 N to 300 N. As a result, there is an advantage that the effect of suppressing radial growth in the center region is properly assured due to the circumferential reinforcing layer 145.

In the pneumatic tire 1, elongation of the belt cords that constitute the circumferential reinforcing layer 145, when the belt cords are of a tire, is not less than 0.5% and not greater than 2.0% when subjected to a tensile load of from 500 N to 1000 N. As a result, there is an advantage that the effect of suppressing radial growth in the center region is properly assured due to the circumferential reinforcing layer 145.

In the pneumatic tire 1, the circumferential reinforcing layer 145 is disposed further to the inner side in the tire width direction than the left and right edge portions of the narrower cross belt 143 of the pair of cross belts 142, 143 (see FIG. 3). The pneumatic tire 1 includes the stress relief rubber 191 disposed between the pair of cross belts 142, 143, on the outer side of the circumferential reinforcing layer 145 in the tire width direction, and adjacent to the circumferential reinforcing layer 145; and the end portion relief rubber 192 disposed between the pair of cross belts 142, 143, on the outer side of the stress relief rubber 191 in the tire width direction and at a position corresponding to the edge portion of the pair of cross belts 142, 143, and adjacent to the stress relief rubber 191 (see FIG. 7).

In such a configuration, there is an advantage that fatigue rupture of the periphery rubber at the edge portion of the circumferential reinforcing layer 145 is suppressed due to the circumferential reinforcing layer 145 being disposed further to the inner side in the tire width direction than the left and right edge portions of the narrower cross belt 143 of the pair of cross belts 142, 143. Since the stress relief rubber 191 is disposed on the outer side of the circumferential reinforcing layer 145 in the tire width direction, shearing strain of the periphery rubber between the edge portion of the circumferential reinforcing layer 145 and the cross belts 142, 143 is alleviated. Moreover, since the end portion relief rubber 192 is disposed at a position corresponding to the edge portions of the cross belts 142, 143, shearing strain of the periphery rubbers at the edge portions of the cross belts 142, 143 is alleviated. Accordingly, there is an advantage that separation of the periphery rubber of the circumferential reinforcing layer 145 is suppressed.

Furthermore, in the pneumatic tire 1, the modulus Ein at 100% elongation of the stress relief rubber 191 and the modulus Eco at 100% elongation of the coating rubber of the pair of cross belts 142, 143 have a relationship satisfying Ein<Eco. As a result, there is an advantage that the modulus Ein of the stress relief rubber 191 is made appropriate and the shearing strain of the periphery rubber between the edge portion of the circumferential reinforcing layer 145 and the cross belts 142, 143 is alleviated.

Furthermore, in the pneumatic tire 1, the modulus Ein at 100% elongation of the stress relief rubber 191 and the modulus Eco at 100% elongation of the coating rubber of the pair of cross belts 142, 143 have a relationship satisfying $0.6 \leq Ein/Eco \leq 0.9$. As a result, there is an advantage that the ratio Ein/Eco is made appropriate and the shearing strain of the peripheral rubber between the edge portion of the circumferential reinforcing layer 145 and the cross belts 142, 143 is alleviated.

Additionally, in the pneumatic tire 1, the modulus Ein at 100% elongation of the stress relief rubber 191 is within a range of $4.0 \text{ MPa} \leq Ein \leq 5.5 \text{ MPa}$ (see FIG. 7). As a result, there is an advantage that the modulus Ein of the stress relief rubber 191 is made appropriate and the shearing strain of the periphery rubber between the edge portion of the circumferential reinforcing layer 145 and the cross belts 142, 143 is alleviated.

Furthermore, in the pneumatic tire 1, the belt layer 14 includes the large angle belt 141 having a belt angle, as an absolute value, of not less than 45° and not greater than 70° (see FIGS. 1 and 3). As a result, there is an advantage that the belt layer 14 is reinforced and the strain of the end portions of the belt layer 14 when the tire contacts the ground is suppressed.

Furthermore, in the pneumatic tire 1, the width Wb1 of the large angle belt 141 and the width Wb3 of the narrower cross belt 143 of the pair of cross belts 142, 143 have a relationship satisfying $0.85 \leq Wb1/Wb3 \leq 1.05$ (see FIG. 3). With such a configuration, the ratio Wb1/Wb3 between the width Wb1 of the large angle belt 141 and the width Wb3 of the narrower cross belt 143 is made appropriate. As a result, there is an advantage that the strain of the end portions of the belt layer 14 when the tire contacts the ground is suppressed.

In the pneumatic tire 1, the circumferential reinforcing layer 145 is disposed further to the inner side in the tire width direction than the left and right edge portions of the narrower cross belt 143 of the pair of cross belts 142, 143 (see FIG. 3). Also, the width Wb3 of the narrower cross belt 143 and the distance S from the edge portion of the circumferential reinforcing layer 145 to the edge portion of the narrower cross belt 143 are in a range of $0.03 \leq S/Wb3 \leq 0.12$. As a result, there is an advantage that a positional relationship S/Wb3 between the edge portions of the cross belts 142, 143 and the edge portions of the circumferential reinforcing layer 145 is made appropriate. Specifically, by satisfying the relationship $0.03 \leq S/Wb3$, the distance from the end portions of the circumferential reinforcing layer 145 to the end portions of the cross belt 143 is properly assured, and the separation of the periphery rubbers at the end portions of these belt plies 145, 143 is suppressed. Additionally, by satisfying the relationship $S/Wb3 \leq 0.12$, the width Ws of the circumferential reinforcing layer 145 relative to the width Wb3 of the cross belt 143 is assured, and hoop effect from the circumferential reinforcing layer 145 is properly assured.

Target of Application

Furthermore, the pneumatic tire 1 is preferably applied to a heavy duty tire with an aspect ratio of not greater than 70% when assembled on a regular rim, inflated to a regular internal pressure, with a regular load applied.

Examples

Figure 9:
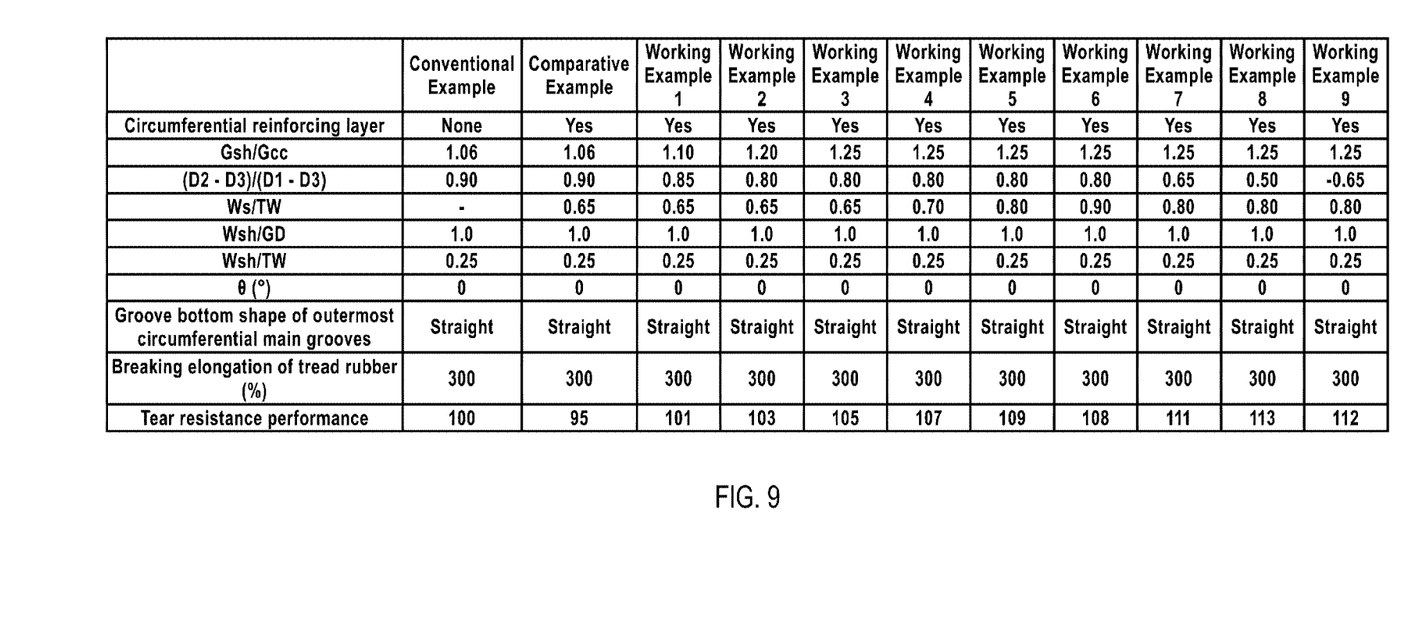
FIG. 9 is a table showing results of performance testing of pneumatic tires according to embodiments of the present technology.
Figure 10:
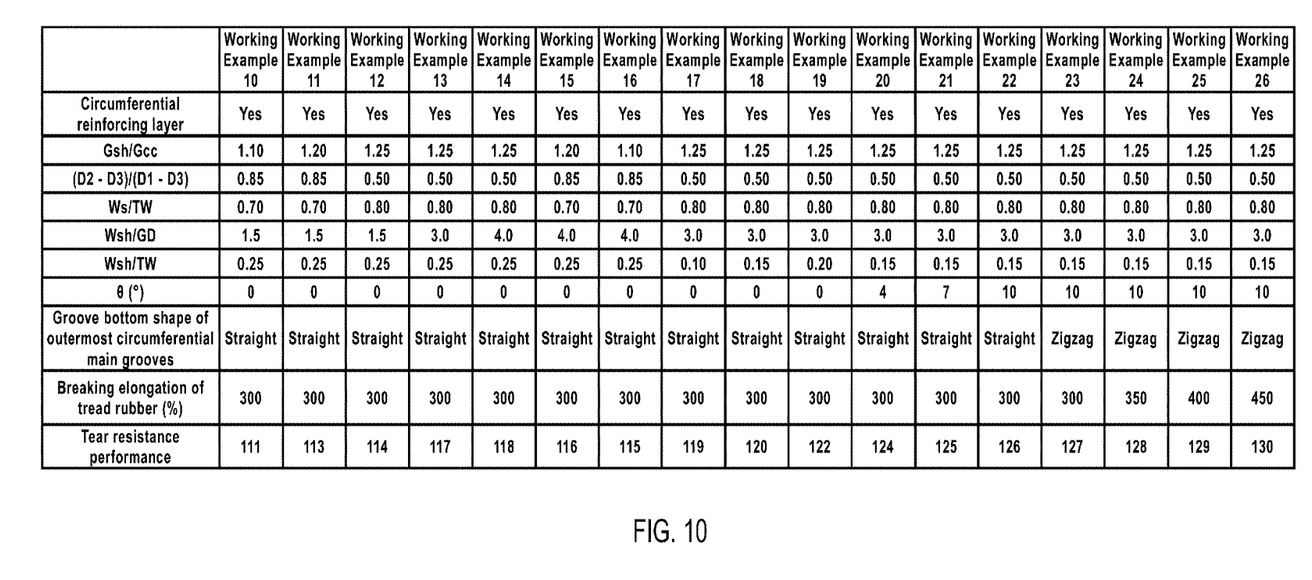
FIG. 10 is a table showing results of performance testing of pneumatic tires according to embodiments of the present technology.

FIGS. 9 and 10 are tables showing the results of performance testing of pneumatic tires according to the embodiments of the present technology.

In the performance testing, a plurality of mutually differing pneumatic tires was evaluated for tear resistance (see FIGS. 9 and 10). In this evaluation, pneumatic tires having a tire size of 315/60 R22.5 were mounted on a rim having a rim size of 22.5×9.00 and inflated with 900 kPa of air pressure. Furthermore, the pneumatic tires were mounted on the front axle of a 4×2 tractor trailer test vehicle, and a load of 34.81 kN was applied to the pneumatic tires. Then, while the test vehicle was turning and traveling, it ran up on a curb 100 mm in height 20 times. After that, tearing that occurred in the shoulder ribs was observed, and an index as an evaluation was given. In this evaluation, higher scores are preferable. Specifically, an evaluation of 115 or greater indicates an effect having dramatic superiority over that of the Conventional Example.

The pneumatic tires 1 of Working Examples 1 to 26 had the configuration illustrated in FIGS. 1 to 3. Also, all land portions 3 are ribs that are continuous in the tire circumferential direction. Additionally, principal dimensions were set at TW=275 mm, Gcc=32.8 mm, D1=950 mm, and GD=14 mm.

In the configuration of FIGS. 1 to 3, the pneumatic tire of the Conventional Example does not have a circumferential reinforcing layer.

As can be seen from the test results, the pneumatic tires 1 of Working Examples 1 to 26 demonstrate improved tire tear resistance performance. Furthermore, by comparing Working Examples 1 to 18 in particular, it can be seen that by satisfying the relationships 1.20≤Gsh/Gcc, D1>D2, D1>D3, −0.65≤(D2−D3)/(D1−D3)≤0.85, 0.70≤Ws/TW≤0.90, and 1.5≤Wsh/GD≤4.0, the effect of dramatically superior tear resistance performance can be obtained.

The invention claimed is:

1. A pneumatic tire comprising: a carcass layer; a belt layer disposed on an outer side of the carcass layer in a tire radial direction; a tread rubber disposed on an outer side of the belt layer in the tire radial direction; at least three circumferential main grooves extending in a tire circumferential direction; and a plurality of land portions defined by the circumferential main grooves;
    left and right circumferential main grooves on an outermost side in a tire width direction are outermost circumferential main grooves, and left and right land portions on an outer side in the tire width direction defined by the outermost circumferential main grooves are shoulder land portions,
    the belt layer being formed by laminating a pair of cross belts having a belt angle, as an absolute value, of not less than 10° and not greater than 45° and having belt angles of mutually opposite signs, and a circumferential reinforcing layer having a belt angle within a range of ±5° with respect to the tire circumferential direction;
    a distance Gcc from a tread profile to a tire inner circumferential surface along a tire equatorial plane and a distance Gsh from a tread edge to the tire inner circumferential surface having a relationship satisfying 1.25≤Gsh/Gcc; and
    an outside diameter D1 of the tread profile along the tire equatorial plane, an outside diameter D2 of the tread profile at an edge portion on an inner side of the shoulder land portion in the tire width direction, and an outside diameter D3 of the tread profile at the tread edge having a relationship satisfying D1>D2, D1>D3, and 0.60≤(D2−D3)/(D1−D3)≤0.85.

2. The pneumatic tire according to claim 1, wherein a tread width TW and a width Ws of the circumferential reinforcing layer have a relationship satisfying 0.70≤Ws/TW≤0.90.

3. The pneumatic tire according to claim 1, wherein a ground contact width Wsh of the shoulder land portions and a groove depth GD of the outermost circumferential main grooves have a relationship satisfying 1.5≤Wsh/GD≤4.0.

4. The pneumatic tire according to claim 1, wherein a ground contact width Wsh of the shoulder land portion and a tread width TW have a relationship satisfying 0.1≤Wsh/TW≤0.2.

5. The pneumatic tire according to claim 1, wherein a groove wall angle θ of the outermost circumferential main grooves on the shoulder land portion side is in a range of 4°≤θ.

6. The pneumatic tire according to claim 1, wherein the outermost circumferential main grooves have a straight shape at a groove opening portion and have a zigzag shape at a groove bottom portion.

7. The pneumatic tire according to claim 1, wherein breaking elongation of the tread rubber is not less than 350%.

8. The pneumatic tire according to claim 1, wherein belt cords of the circumferential reinforcing layer are steel wire and have a number of ends of not less than 17 ends/50 mm and not greater than 30 ends/50 mm.

9. The pneumatic tire according to claim 1, wherein elongation of belt cords that constitute the circumferential reinforcing layer is not less than 1.0% and not greater than 2.5% upon a tensile load being from 100 N to 300 N.

10. The pneumatic tire according to claim 1, wherein elongation of belt cords that constitute the circumferential reinforcing layer is not less than 0.5% and not greater than 2.0% upon a tensile load being from 500 N to 1000 N.

11. The pneumatic tire according to claim 1, wherein the circumferential reinforcing layer is disposed further to an inner side in the tire width direction than left and right edge portions of a narrower cross belt of the pair of cross belts; and further comprising
    a stress relief rubber disposed between the pair of cross belts and disposed on an outer side of the circumferential reinforcing layer in the tire width direction, the stress relief rubber being adjacent to the circumferential reinforcing layer; and
    an end portion relief rubber disposed between the pair of cross belts and disposed on an outer side of the stress relief rubber in the tire width direction and in a position corresponding to an edge portion of the pair of cross belts, the end portion relief rubber being adjacent to the stress relief rubber.

12. The pneumatic tire according to claim 11, wherein a modulus Ein at 100% elongation of the stress relief rubber and a modulus Eco at 100% elongation of a coating rubber of the pair of cross belts have a relationship satisfying Ein<Eco.

13. The pneumatic tire according to claim 11, wherein a modulus Ein at 100% elongation of the stress relief rubber and a modulus Eco at 100% elongation of a coating rubber of the pair of cross belts have a relationship satisfying 0.6≤Ein/Eco≤0.9.

14. The pneumatic tire according to claim 11, wherein a modulus Ein at 100% elongation of the stress relief rubber is within a range of 4.0 MPa≤Ein≤5.5 MPa.

15. The pneumatic tire according to claim 1, wherein the belt layer has a large angle belt having a belt angle, as an absolute value, of not less than 45° and not greater than 70°.

16. The pneumatic tire according to claim 15, wherein a width Wb1 of the large angle belt and a width Wb3 of a narrower cross belt of the pair of cross belts have a relationship satisfying 0.85≤Wb1/Wb3≤1.05.

17. The pneumatic tire according to claim 15, wherein a breaking elongation λ1 of the large angle belt is in a range of λ1≥200%.

18. The pneumatic tire according to claim 1, wherein the circumferential reinforcing layer is disposed further to the inner side in the tire width direction than left and right edge portions of a narrower cross belt of the pair of cross belts, and a width Wb3 of the narrower cross belt and a distance S from an edge portion of the circumferential reinforcing layer to an edge portion of the narrower cross belt are in a range of 0.03≤S/Wb3.

19. The pneumatic tire according to claim 18, wherein 0.03≤S/Wb3≤0.09.

20. The pneumatic tire according to claim 1 applied to a heavy duty tire with an aspect ratio of 70% or less.

21. The pneumatic tire according to claim 1, wherein ends of the circumferential reinforcing layer are located to the inside of the outermost circumferential main grooves in the tire width direction.

22. The pneumatic tire according to claim 1, wherein the outermost circumferential main grooves have a greater groove width than other of the circumferential main grooves.

23. The pneumatic tire according to claim 1, wherein moduli E2, E3 at 100% elongation of the pair of cross belts and the modulus Es at 100% elongation of the circumferential reinforcing layer have relationships satisfying 0.90≤Es/E2≤1.10 and 0.90≤Es/E3≤1.10.

24. The pneumatic tire according to claim 1, wherein the circumferential reinforcing layer terminates at an inner side of the outermost circumferential direction main groove in the tire width direction.

25. A pneumatic tire comprising: a carcass layer; a belt layer disposed on an outer side of the carcass layer in a tire radial direction; a tread rubber disposed on an outer side of the belt layer in the tire radial direction; at least three circumferential main grooves extending in a tire circumferential direction; and a plurality of land portions defined by the circumferential main grooves;

left and right circumferential main grooves on an outermost side in a tire width direction are outermost circumferential main grooves, and left and right land portions on an outer side in the tire width direction defined by the outermost circumferential main grooves are shoulder land portions, the belt layer being formed by laminating a pair of cross belts having a belt angle, as an absolute value, of not less than 10° and not greater than 45° and having belt angles of mutually opposite signs, and a circumferential reinforcing layer having a belt angle within a range of ±5° with respect to the tire circumferential direction;

a distance Gcc from a tread profile to a tire inner circumferential surface along a tire equatorial plane and a distance Gsh from a tread edge to the tire inner circumferential surface having a relationship satisfying 1.25≤Gsh/Gcc; and an outside diameter D1 of the tread profile along the tire equatorial plane, an outside diameter D2 of the tread profile at an edge portion on an inner side of the shoulder land portion in the tire width direction, and an outside diameter D3 of the tread profile at the tread edge having a relationship satisfying D1>D3>D2 and −0.65≤(D2−D3)/(D1−D3)≤0.

* * * * *